United States Patent
Michalopoulos et al.

(10) Patent No.: US 12,052,677 B2
(45) Date of Patent: Jul. 30, 2024

(54) APPARATUS AND METHOD FOR TIME SYNCHRONIZATION

(71) Applicant: Nokia Solutions and Networks Oy, Espoo (FI)

(72) Inventors: Diomidis Michalopoulos, Munich (DE); Daejung Yoon, Massy (FR); Joerg Schaepperle, Stuttgart (DE)

(73) Assignee: Nokia Solutions and Networks Oy, Espoo (FI)

(*) Notice: Subject to any disclaimer, the term of this patent is extended or adjusted under 35 U.S.C. 154(b) by 457 days.

(21) Appl. No.: 17/452,478

(22) Filed: Oct. 27, 2021

(65) Prior Publication Data
US 2022/0141782 A1 May 5, 2022

(30) Foreign Application Priority Data
Nov. 2, 2020 (FI) .................. 20206099

(51) Int. Cl.
*H04W 56/00* (2009.01)
*G01S 5/04* (2006.01)
*H04W 4/029* (2018.01)

(52) U.S. Cl.
CPC ............ *H04W 56/002* (2013.01); *G01S 5/04* (2013.01); *H04W 4/029* (2018.02); *H04W 56/005* (2013.01)

(58) Field of Classification Search
CPC . H04W 56/002; H04W 4/029; H04W 56/005; H04W 56/001; H04W 64/00; G01S 5/04; G01S 5/10; H04J 3/0638
See application file for complete search history.

(56) References Cited

U.S. PATENT DOCUMENTS

| | | | |
|---|---|---|---|
| 8,692,715 B2 | 4/2014 | Siomina et al. | |
| 8,731,580 B2* | 5/2014 | Li | H04W 64/00 455/456.2 |

(Continued)

FOREIGN PATENT DOCUMENTS

| | | |
|---|---|---|
| CN | 1511385 A | 7/2004 |
| CN | 102742312 A | 10/2012 |

(Continued)

OTHER PUBLICATIONS

Extended European Search Report received for corresponding European Patent Application No. 21204614.8, dated Mar. 23, 2022, 9 pages.

(Continued)

*Primary Examiner* — Vinncelas Louis
(74) *Attorney, Agent, or Firm* — Nokia Solutions and Networks Oy

(57) ABSTRACT

An apparatus is disclosed, the apparatus comprising means for estimating a first angle ($\theta_1$) between a first path between a first base station and at least one target node and a second path between the first base station and a second base station, and estimating a second angle ($\theta_2$) between a third path between the second base station and the at least one target node and the second path. The apparatus also comprises means for determining a value ($\Delta d$) indicative of a difference between a first distance between the at least one target node and the first base station and a second distance between the at least one target node and the second base station, wherein determining the value is based on the estimated first and second angles ($\theta_1$) ($\theta_2$) and a known distance (l) between the first and second base stations.

12 Claims, 6 Drawing Sheets

(56) References Cited

U.S. PATENT DOCUMENTS

| | | | |
|---|---|---|---|
| 9,684,057 B2* | 6/2017 | Siomina | G01S 5/10 |
| 2009/0310505 A1 | 12/2009 | Tsai et al. | |
| 2011/0304506 A1* | 12/2011 | Choi | G01S 5/10 |
| | | | 342/387 |
| 2016/0183207 A1 | 6/2016 | Ruffini et al. | |
| 2017/0227623 A1 | 8/2017 | Park et al. | |
| 2019/0045477 A1 | 2/2019 | Edge | |
| 2019/0306821 A1 | 10/2019 | Hu et al. | |
| 2020/0127784 A1 | 4/2020 | Akkarakaran et al. | |
| 2020/0229124 A1 | 7/2020 | Soriaga et al. | |

FOREIGN PATENT DOCUMENTS

| | | |
|---|---|---|
| CN | 104185277 A | 12/2014 |
| CN | 105578588 A | 5/2016 |
| CN | 105979583 B | 10/2019 |
| CN | 111263299 A | 6/2020 |
| EP | 1261147 A | 11/2002 |
| WO | 2000/57661 A1 | 9/2000 |

OTHER PUBLICATIONS

Salamah et al., "Dynamic Hardware-Oriented Algorithm for Angle of Arrival Positioning Technique", IEEE International Conference on Signal Processing and Communications, Nov. 24-27, 2007, pp. 201-204.

"3rd Generation Partnership Project; Technical Specification Group Radio Access Network; NG-RAN; NR Positioning Protocol A (NRPPa) (Release 16)", 3GPP TS 38.455, V16.0.0, Jul. 2020, pp. 1-60.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.1.0, Jul. 2020, pp. 1-114.

"3rd Generation Partnership Project; Technical Specification Group Radio Access Network; Network Assistance for Network Synchronization (Release 14)", 3GPP TR 36.898, V14.0.0, Jan. 2017, pp. 1-25.

"Network synchronization based on RAT-dependent signals", 3GPP TSG RAN WG1 Meeting#97, R1-1906309, Agenda: 7.2.10.5, CATT, May 13-17, 2019, 6 pages.

Rosado et al., "Downlink synchronization of LTE base stations for opportunistic ToA positioning", International Conference on Localization and GNSS (ICL-GNSS), Jun. 22-24, 2015, 6 pages.

Xiao et al., "An Overview on Integrated Localization and Communication Towards 6G", arXiv, Jun. 2, 2020, pp. 1-35.

Office action received for corresponding Finnish Patent Application No. 20206099, dated Mar. 31, 2021, 9 pages.

Office Action received for corresponding Chinese Patent Application No. 202111281136.0, dated Jan. 10, 2024, 6 pages of Office Action and no page of translation available.

* cited by examiner

APPARATUS AND METHOD FOR TIME SYNCHRONIZATION

FIELD

Embodiments relate to an apparatus and method for time synchronization, for example for time synchronization of base stations.

BACKGROUND

In a radio communications system, base stations of a radio access network (RAN) need to be time synchronized with a high degree of accuracy. For example, time synchronization between base stations is important for determining the position of one or more target nodes, e.g. user equipment (UE). Position determination may be useful for optimization of radio resources, provision of position-based radio or data services, and/or emergency positioning. In the context of a typical RAN, position determination may be performed by a location management function (LMF) which may be in the core network.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising: estimating a first angle ($\theta_1$) between a first path between a first base station and at least one target node and a second path between the first base station and a second base station; estimating a second angle ($\theta_2$) between a third path between the second base station and the at least one target node and the second path; and determining a value ($\Delta d$) indicative of a difference between a first distance from the at least one target node to the first base station and a second distance from the at least one target node to the second base station, wherein determining the value is based on the estimated first and second angles ($\theta_1$) ($\theta_2$) and a known distance (l) between the first and second base stations.

The means for determining the value ($\Delta d$) may be configured to use the geometric relationship:

$$d1 - d2 = l\frac{\sin\theta_2 - \sin\theta_1}{\sin(\theta_1 + \theta_2)}$$

The apparatus may further comprising means for determining a timing correction value based on the determined value ($\Delta d$).

The apparatus may further comprise means for: receiving from the at least one target node a reference signal time difference (RSTD) measurement between the first base station and the second base station; and converting the determined value ($\Delta d$) into a time-domain value ($\Delta t$), wherein the timing correction is determined based on a comparison of the time-domain value ($\Delta t$) and the received RSTD.

The apparatus may further comprise means for using the timing correction value so as to synchronize respective clocks of said first and second base stations.

The apparatus may further comprise means for estimating a position of the at least one target node using the received RSTD measurement, wherein the timing correction is used to modify the position estimate.

The apparatus may further comprise means for estimating the first angle ($\theta_1$), estimating the second angle ($\theta_2$) and determining the value ($\Delta d$) over a period of time for different positions of the at least one target node and determining an average or aggregated value therefrom for providing a timing correction.

The apparatus may further comprise means for estimating the first angle ($\theta_1$), estimating the second angle ($\theta_2$) and determining the value ($\Delta d$) for a plurality of target nodes and providing an average or aggregated value therefrom for providing a timing synchronization correction between the first and the second base stations The apparatus may further comprise means for selecting the first and second base stations based on receiving a determined or reported decrease in positioning accuracy for said first and second base stations.

The apparatus may further comprise means for selecting the at least one target node from a plurality of target nodes based on its or their distance to the first and second base stations The means may be configured to estimate the first and second angles ($\theta_1$) ($\theta_2$) based on a received measurement from each of the first and second base stations indicative of an angle-of-arrival of an uplink signal from the at least one target node to antennas of the respective first and second base stations.

The means may be further configured to estimate the first and second angles ($\theta_1$) ($\theta_2$) based on the received measurement from each of the first and second base stations and an additional angle based on relative orientations of the antennas of the first and second base stations.

The means may be configured to estimate the first and second angles ($\theta_1$) ($\theta_2$) based on a received measurement from the at least one target node indicative of an angle-of-departure of a downlink signal to said target node from each of the respective first and second base stations.

According to a second aspect, there is described a method comprising: estimating a first angle ($\theta_1$) between a first path between a first base station and at least one target node and a second path between the first base station and a second base station; estimating a second angle ($\theta_2$) between a third path between the second base station and the at least one target node and the second path; and determining a value ($\Delta d$) indicative of a difference between a first distance from the at least one target node to the first base station and a second distance from the at least one target node to the second base station, wherein determining the value is based on the estimated first and second angles ($\theta_1$) ($\theta_2$) and a known distance (l) between the first and second base stations.

The means for determining the value ($\Delta d$) may be configured to use the geometric relationship:

$$d1 - d2 = l\frac{\sin\theta_2 - \sin\theta_1}{\sin(\theta_1 + \theta_2)}$$

The method may further comprise determining a timing correction value based on the determined value ($\Delta d$).

The method may further comprise: receiving from the at least one target node a reference signal time difference (RSTD) measurement between the first base station and the second base station; and converting the determined value ($\Delta d$) into a time-domain value ($\Delta t$), wherein the timing correction is determined based on a comparison of the time-domain value ($\Delta t$) and the received RSTD.

The method may further comprise using the timing correction value so as to synchronize respective clocks of said first and second base stations.

The method may further comprise estimating a position of the at least one target node using the received RSTD measurement, wherein the timing correction is used to modify the position estimate.

The method may further comprise estimating the first angle ($\theta_1$), estimating the second angle ($\theta_2$) and determining the value ($\Delta d$) over a period of time for different positions of the at least one target node and determining an average or aggregated value therefrom for providing a timing correction.

The method may further comprise estimating the first angle ($\theta_1$), estimating the second angle ($\theta_2$) and determining the value ($\Delta d$) for a plurality of target nodes and providing an average or aggregated value therefrom for providing a timing synchronization correction between the first and the second base stations The method may further comprise selecting the first and second base stations based on receiving a determined or reported decrease in positioning accuracy for said first and second base stations.

The method may further comprise selecting the at least one target node from a plurality of target nodes based on its or their distance to the first and second base stations Estimating the first and second angles ($\theta_1$) ($\theta_2$) may be based on a received measurement from each of the first and second base stations indicative of an angle-of-arrival of an uplink signal from the at least one target node to antennas of the respective first and second base stations.

Estimate the first and second angles ($\theta_1$) ($\theta_2$) may be based on the received measurement from each of the first and second base stations and an additional angle based on relative orientations of the antennas of the first and second base stations.

Estimating the first and second angles ($\theta_1$) ($\theta_2$) may be based on a received measurement from the at least one target node indicative of an angle-of-departure of a downlink signal to said target node from each of the respective first and second base stations.

According to a third aspect, there is provided a computer program product comprising a set of instructions which, when executed on an apparatus, is configured to cause the apparatus to carry out the method of any preceding method definition of the second aspect.

According to a fourth aspect, there is provided a non-transitory computer readable medium comprising program instructions stored thereon for performing a method, comprising: estimating a first angle ($\theta_1$) between a first path between a first base station and at least one target node and a second path between the first base station and a second base station; estimating a second angle ($\theta_2$) between a third path between the second base station and the at least one target node and the second path; and determining a value ($\Delta d$) indicative of a difference between a first distance from the at least one target node to the first base station and a second distance from the at least one target node to the second base station, wherein determining the value is based on the estimated first and second angles ($\theta_1$) ($\theta_2$) and a known distance (l) between the first and second base stations.

The program instructions of the fourth aspect may also perform operations according to any preceding method definition of the second aspect.

According to a fifth aspect, there is provided an apparatus comprising: at least one processor; and at least one memory including computer program code which, when executed by the at least one processor, causes the apparatus: to estimate a first angle ($\theta_1$) between a first path between a first base station and at least one target node and a second path between the first base station and a second base station; to estimate a second angle ($\theta_2$) between a third path between the second base station and the at least one target node and the second path; and to determine a value ($\Delta d$) indicative of a difference between a first distance from the at least one target node to the first base station and a second distance from the at least one target node to the second base station, wherein determining the value is based on the estimated first and second angles ($\theta_1$) ($\theta_2$) and a known distance (l) between the first and second base stations.

The computer program code of the fifth aspect may also perform operations according to any preceding method definition of the second aspect.

BRIEF DESCRIPTION OF DRAWINGS

Example embodiments will now be described by way of non-limiting example, with reference to the accompanying drawings, in which.

DETAILED DESCRIPTION

Figure 3:
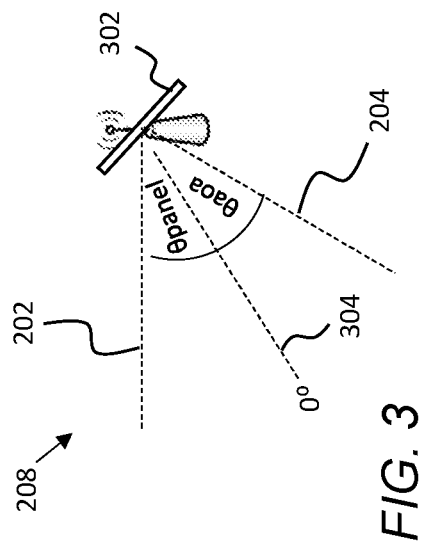
FIG. 3 is a detailed view of part of the FIG. 2 network.

Embodiments relate to an apparatus and method for time synchronization, for example for time synchronization of base stations. For example, the base stations may be part of a radio access network (RAN). The base stations may need to be time synchronized with a high degree of accuracy for determining the position of one or more target nodes which may be mobile nodes such as radio user equipment (UE). In this context, position means geo-spatial position.

In one method for position determination, generally referred to as Observed Time Difference of Arrival (OTDOA) positioning, reference signals are transmitted by base stations, which signals may be received and measured by a target node (the position of which is to be determined) and reported back to some network function for determination of position using triangulation. The reference signals transmitted by the base stations may be Positioning Reference Signals (PRS) which are defined in the 3GPP LTE standard (Release-9). However, in principle, other downlink signals may be used for position determination.

The position of the target node may be determined based on the time of arrival (ToA) of the reference signals from different base stations. With knowledge of when the reference signals were transmitted, this enables calculation of the time-of-flight which is proportional to the distance to the respective base station that transmitted the reference signal. With knowledge of three or more such distances, it is possible to triangulate the position of the target node.

Each base station has a local clock and the clocks of the base stations need to be time synchronized very accurately and reliably for OTDOA methods to provide an accurate position. As inter-base station synchronization degrades, OTDOA measurements become less accurate and the position error increases in proportion.

Example embodiments disclose an apparatus and method suitable for base station synchronization and possibly other functionality, although the former is the focus of this description. Example embodiments may provide advantages over existing methods, including cabled, over-the-air and GNSS methods, as will be mentioned later on.

A target node may be a mobile node. For example, a target node may be any of a mobile telephone, laptop, tablet computer, digital assistant, wearable processing device, vehicle or craft having communications functionality. Indeed, a target node may be any form of apparatus or system having communications functionality that enables it to communicate radio signals with base stations.

A base station may comprise any communications node having a position which is known or derivable. The communications node may be substantially fixed in terms of its position. One example is a RAN base station, e.g. a 2G, 3G, 4G, LTE or 5G base station, or indeed a base station suitable for any future generation RAN. Such base stations may be referred to as NodeBs (nB), eNodeBs (eNB) or gNodeBs (gNBs) depending on the RAN generation. A base station may not necessarily be used to transmit data to mobile devices connected to it, but can be a fixed station transmitting a beacon signal used for positioning purposes; hence, the base station may be referred to as a transmission point (TRP). Another example is a wireless internet access point, e.g. a WiFi or WiMax access point. These examples are merely for illustration and a base station may comprise any communications node of known or derivable position having communications functionality that enables it to transmit radio signals with target nodes.

A base station may also communicate with one or more other nodes. The other nodes may comprise other base stations and/or one or more systems associated with control and/or management of a RAN. Such systems may be part of a core or backhaul network. An example management function may be position determination for one or more target nodes within range of one or more base stations of the RAN. For example, position determination of a particular target node may be useful for optimization of radio resources, provision of position-based radio or data services and/or emergency positioning.

As used herein, the term "determining" may comprise "estimating" and the term "providing" may comprise "generating" or "receiving".

Figure 1:
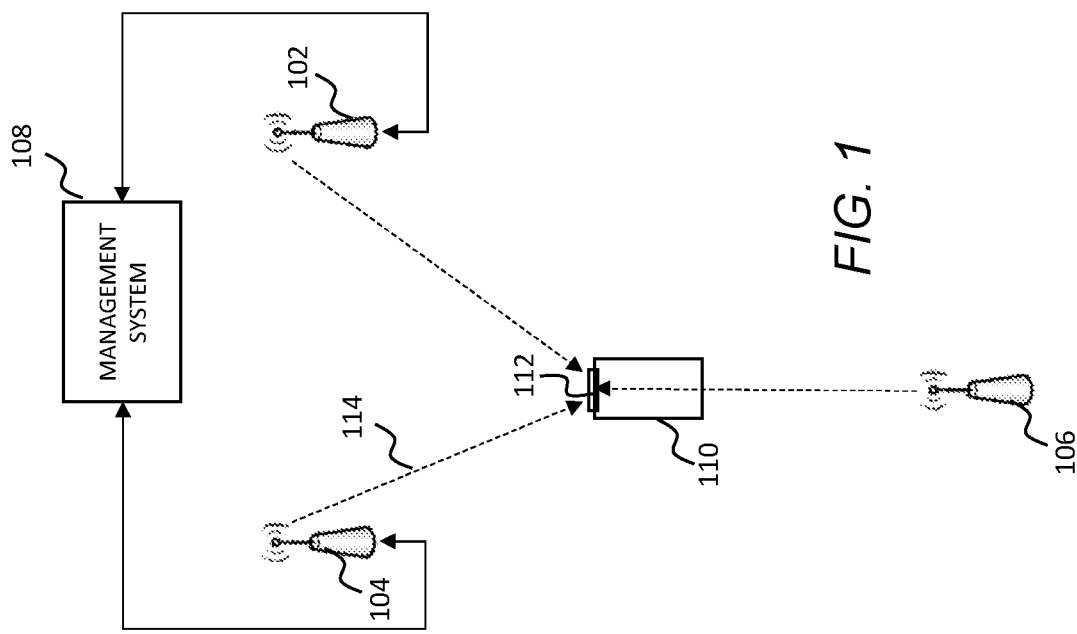
FIG. 1 is schematic view of at least part of a radio access network.

FIG. 1 shows in schematic view first and second base stations 102, 104 which are spatially separated and which may be in signal communication with a management system 108. A third base station 106 is also shown for realistic context. The first, second and third base stations 102, 104, 106 may be associated with a common RAN of which the management system 108 may provide some management function such as position determination. A target node 110 is also shown in relation to the first, second and third base stations 102, 104, 106, which target node may be a user equipment (UE) having an associated radio frequency (RF) antenna 112 for wireless communications with the base stations. The target node 110 may comprise, for example, a mobile telephone. The target node 110 is shown in spatial relation to the first, second and third base stations 102, 104, 106. The first, second and third base stations 102, 104, 106 may comprise, but are not limited to, gNBs.

As is shown, the first, second and third base stations 102, 104, 106 may transmit over a downlink respective reference signals, e.g. the aforementioned PRS signals. The reference signals may be received by the target node 110. As in a conventional downlink type positioning method, such as OTDOA, the target node 110 may receive and measure each reference signal to determine the ToA for the reference signal and therefore the time of flight for reporting back to the management system 108 which may use said indication to perform triangulation. Reporting to the management system 108 may comprise data transmitted via a serving base station, which we may assume is the first base station 102.

More commonly, what is reported by the target node 110 is an indication of the ToA difference between one of the base stations, e.g. the serving base station 102, and each of one or more "neighbour" base stations 104, 106. This indication of ToA difference may be referred to as the Reference Signal Time Difference (RSTD) and may be more commonly used because it does not rely on synchronization between the base stations 102, 104, 106 and the target node 110. The RSTD is proportionate to the difference in distance to the reference base station and the relevant neighbour base station. For example, the target node 110 may report RSTD data indicative of the difference in distance to the serving base station 102 and the second base station 104. The RSTDs, when combined with multiple combinations of pair of base stations measured at the target node, may be used to determine the position of the target node 110.

According to example embodiments, one or more target nodes 110 may be used for improving timing synchronization between the first and second base stations 102, 104 and/or other pairwise combinations of the base stations of the RAN. This may be in response to a separate determination that, for example, the first and second base stations 102, 104 are currently not synchronized to a required accuracy, which may itself be derived using known methods such as by detecting a loss of positioning accuracy in respect of these base stations.

In the following example, it is assumed that the first and second base stations 102, 104 require synchronization and the target node 110 is selected for use in the example. This selection of the target node 110 may be on the basis of its distance to the first and second base stations 102, 104. For example, the target node 110 may be the closest to the first and second base stations 102, 104 but other criteria may be applied. The position of the target node 110 is not itself critical to the methods described below. As also mentioned below, a plurality of target nodes may be used and/or different positions of the one or plurality of target nodes may be used.

Figure 2:
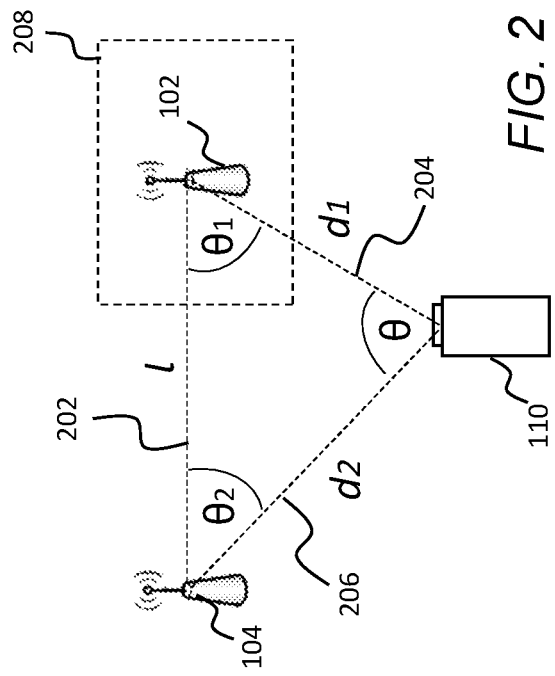
FIG. 2 is schematic view showing part of the FIG. 1 network, indicating at least some parameters employed according to one or more example embodiments.

FIG. 2 shows in schematic view the first and second base stations 102, 104 shown in FIG. 1. The first base station 102 and the second base station 104 have respective positions which are known or are derivable to the management system 108 and hence the management system may calculate a distance l between said base stations. The distance l may correspond to the distance of the straight-line path 202 between said first and second base stations 102, 104. Alternatively, or additionally, the management system 108 may store or have access to the value of the distance l itself. The management system 108 may store or access data indicative of the respective positions of multiple base stations and/or multiple distances between different pairwise combinations of base stations of the relevant RAN.

The first and second base stations 102, 104 are assumed to be in signal communication with the management system 108 shown in FIG. 1.

The first and second base stations 102, 104 may transmit PRS signals to the target node 110 which may report the calculated RSTD to the management system 108 in the conventional manner. As indicated above, the RSTD may be considered proportionate to the difference in distance of first and second paths 204, 206, the first path being an assumed straight-line path between the first base station 102 and the target node 110 and the second path being an assumed straight-line path between the second base station 104 and the target node. The RSTD as reported to the management system 108 may be used subsequently.

According to an example embodiment, which may comprise operations performed at the management system 108, first and second angles ($\theta_1$) ($\theta_2$) as indicated in FIG. 2 may be estimated.

The first angle ($\theta_1$) may be an estimated angle between the first path 204 and the path 202 between the first and second base stations 102, 104. The second angle ($\theta_2$) may be an estimated angle between the second path 206 and the straight-line path 202 between the first and second base stations 102, 104. The path 202 may be termed the third path.

This estimation may be performed based on, for example, angle-of-arrival (AoA) measurements at the respective first and second base stations 102, 104 for uplink signals sent by the target node 110 to said base stations. The uplink signals may be Sounding Reference Signals (SRS), for example. The uplink signals may be transmitted by the target node 110 responsive to configuration by the management system 108 for scheduling the SRS. A configuration signal may be sent via the first base station 102 as serving base station.

In another example, the estimation may be performed based on, for example, angle-of-departure (AoD) estimation derived from received signal measurements performed at the target node 110 for signals transmitted by the first and second base stations 102, 104. The target node 110 may report the received signal power measurements to the management system 108, possibly via the first base station 102 as serving base station, where the AoD may be calculated. Such received power measurements for AoD calculation are henceforth referred to as AoD-related measurements.

In another example, a base station, e.g. the first base station 102 as serving base station, may obtain AoA measurements from the target node 110 and may measure the AoD toward the target node. A second base station 104 may obtain AoA measurements from the target node 110 and may measure the AoD toward the target node, so that the first base station can estimate both the first and second angles ($\theta_1$) ($\theta_2$).

FIG. 3 is a schematic view of a section 208 of FIG. 2, which may be useful for understanding the abovementioned angle (AoA or AoD) measurement method in respect of determining the first angle ($\theta_1$).

Referring to FIG. 3, the first base station 102 comprises an RF antenna 302 which may comprise an antenna array having multiple antenna elements. In general, by measuring the difference in received phase of a signal transmitted by the target node 110 on the uplink, the effective delay in arrival at each element can be measured and converted to an AoA measurement. Thereafter, the first angle ($\theta_1$) may be determined to comprise two angles, including a value of $\theta_{aoa}$ based on the AoA measurement. Here, the value of $\theta_{aoa}$ may be determined with respect to a reference axis 304 (see the zero degree line) which may be the boresight of the RF antenna 302. A further inter-base station angle $\theta_{panel}$ may be determined, representing the angle between the reference axis 304 and the inter-base station path 202. Put another way, based on knowledge by the management system 108 of the antenna boresights of the first and second base stations 102, 104 with respect to a common reference direction, a value of $\theta_{panel}$ can be determined. With both angles determined, the value of the first angle ($\theta_1$) can be determined using:

$$\theta_1 = \theta_{aoa} + \theta_{panel} \qquad (1)$$

where $\theta_{aoa}$ is the measured AoA for an uplink signal from the target node 110 to the particular base station 102, 104 and $\theta_{panel}$ is the inter-base station angle between the reference axis 304 of the particular base station and the inter-base station path 202. Other methods may be used.

The same principles apply to determination of the second angle ($\theta_2$).

Based on knowledge of the first angle ($\theta_1$), the second angle ($\theta_2$) and the known inter-base station distance l, geometric or trigonometric relations can be used to derive an estimated value of the difference d1−d2, or Δd. Δd is indicative of the difference between (i) a first distance (d1) between the target node 110 and the first base station 102 and (ii) a second distance (d2) between the target node and the second base station 104.

By converting the value of Δd to the time domain, i.e. by dividing by the speed of light, a value of Δt may be derived which may be compared by the management system 108 with the previously reported value of RSTD for the first and second base stations 102, 104. From this, a timing correction can be determined. The timing correction may be a relative timing correction value, i.e. a correction to the RSTD. For example, if the RSTD was reported to be 6 ns, and the time domain Δt is 4 ns, the system may observe a 2 ns difference and hence the timing correction will be 2 ns. The timing correction can be sent by the management system 108 to the first and second base stations 102, 104 for local clock correction. For example, this could involve a split timing correction with a 1 ns correction sent to one of the first and second base stations 102, 104 and a −1 ns correction sent to the other base station. Alternatively, or additionally, the timing correction can be used by the management system 108 to adapt position coordinates generated using the base station clocks as currently configured.

The geometric or trigonometric relation may, for example, derive from the law of sines, which here is adapted for the FIG. 2 scenario:

$$\frac{l}{\sin\varphi} = \frac{d1}{\sin\theta_2} = \frac{d2}{\sin\theta_1} \quad (2)$$

Taking the law of angles in a triangle in conjunction with sines of complementary angles:

$$\sin\varphi = \sin(\theta_1 + \theta_2) \quad (3)$$

we can combine equations (1) and (2) and simplify to derive a formula for a geometric version of d1−d2, referred to above as Δd. The formula may be expressed as:

$$\Delta d = d1 - d2 = l\frac{\sin\theta_2 - \sin\theta_1}{\sin(\theta_1 + \theta_2)} \quad (4)$$

It follows that, in the time domain, the value of Δt may be expressed as:

$$\Delta t = l\frac{\sin\theta_2 - \sin\theta_1}{c \cdot \sin(\theta_1 + \theta_2)} \quad (5)$$

where c is the speed of light, i.e. 299792458 m/s.

AoA measurement in FIG. 3 can be replaced with AoD measurement using downlink reference signal.

Figure 4:
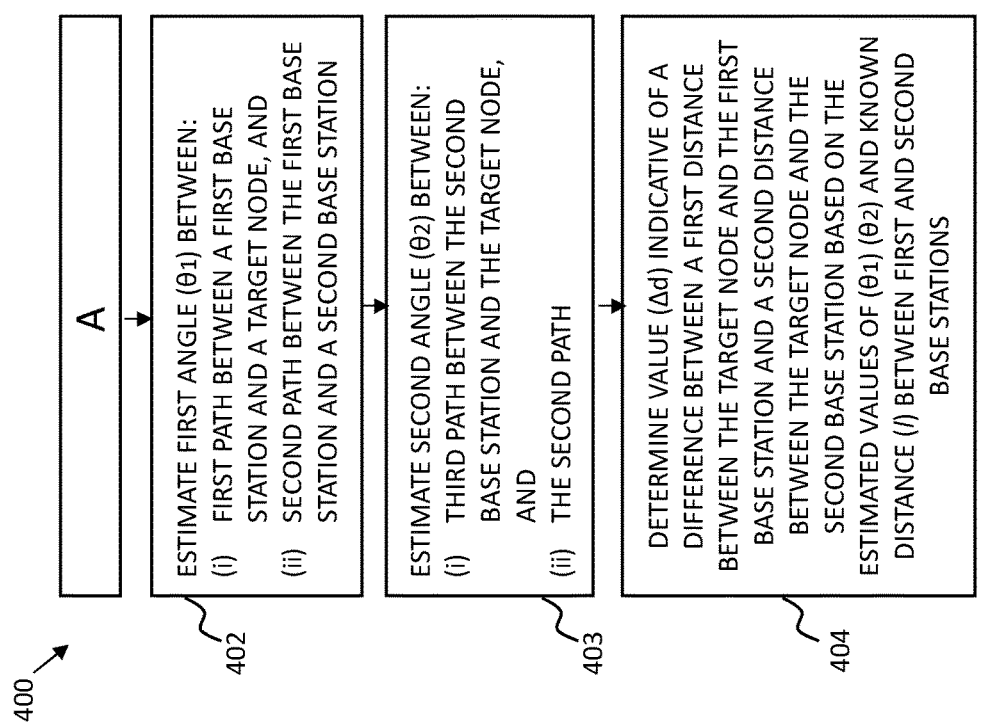
FIG. 4 is a flow diagram showing processing operations that may be performed according to one or more example embodiments.

FIG. 4 is a flow diagram showing processing operations that may be performed in accordance with example embodiments, using the FIG. 2 scenario for illustration. It will be appreciated that variations are possible, for example to add, remove and/or replace certain operations. The operations may be performed in hardware, software or a combination thereof. The processing operations may be performed, for example, by the management system 108

Operations of the FIG. 4 flow diagram may be collectively referred to as operations "A" 400 for ease of explanation.

A first operation 402 may comprise estimating a first angle ($\theta_1$) between a first path 204 between a first base station 102 and at least one target node 110, and a second path 202 between the first base station and a second base station 104.

A second operation 403 may comprise estimating a second angle ($\theta_2$) between a third path 206 between the second base station 104 and the at least one target node 110, and the second path 202.

A third operation 404 may comprise determining a value (Δd) indicative of a difference between a first distance d1 between the at least one target node 110 and the first base station 102 and a second distance d2 between the at least one target node 110 and the second base station 104, wherein determining the value is based on the estimated first and second angles ($\theta_1$) ($\theta_2$) and a known distance (l) between the first and second base stations.

Equation (4) above is given as an example for determining Δd although other geometric relations could be used.

Other operations may comprise receiving, from the at least one target node 110, a reference signal time difference (RSTD) measurement between the first base station and the second base station, converting the determined value (Δd) into a time-domain value (Δt). A timing correction may be determined based on a comparison of the time-domain value (Δt) and the received RSTD.

Figure 5:
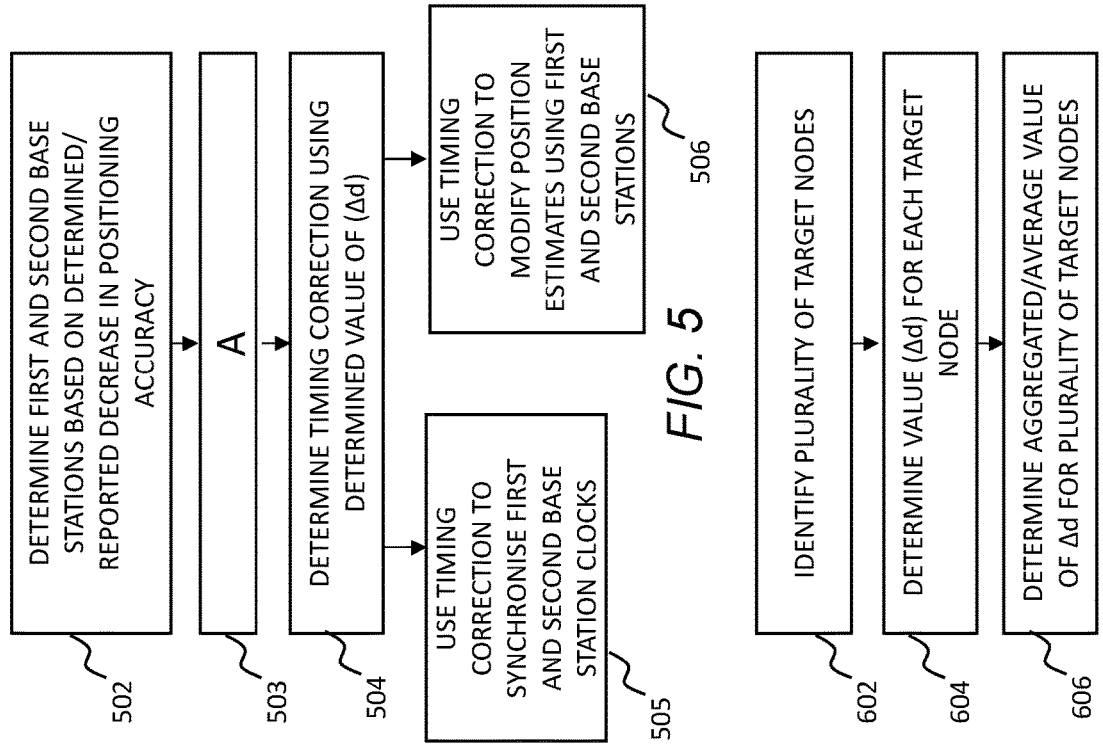
FIG. 5 is a flow diagram showing other processing operations that may be performed according to one or more example embodiments.

FIG. 5 is a flow diagram showing processing operations that may be performed in accordance with another example embodiment, using the FIG. 2 scenario for illustration. It will be appreciated that variations are possible, for example to add, remove and/or replace certain operations. The operations may be performed in hardware, software or a combination thereof. The processing operations may be performed, for example, by the management system 108.

A first operation 502 may comprise determining first and second base stations 102, 104 based on a determined and/or reported decrease in positioning accuracy, e.g. timing drift.

A second operation 503, which may be triggered by the report about timing drift in the first operation 502, may comprise the operations 402-404 described above for FIG. 4.

A third operation 504 may comprise determining a timing correction based on the determined value of Δd, i.e. using Δt.

A fourth operation 505 may comprise using the timing correction to synchronize the first and second base station clocks. Alternatively, a fifth operation 506 may comprise using the timing correction to modify position estimates (e.g. coordinates) calculated based on using the unsynchronized transmitted base station signals, e.g. PRS signals.

The aforementioned examples assume use of one target node 110. In some embodiments, the processes described above with reference to FIGS. 4 and 5 may be performed for multiple target nodes to determine multiple values of Δd/Δt which may then be aggregated or averaged to derive a more accurate value.

Figure 6:
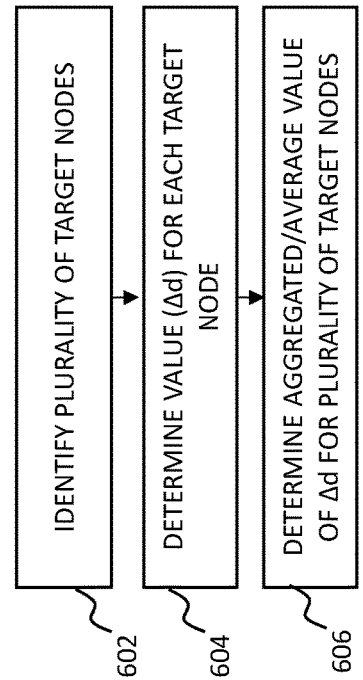
FIG. 6 is a flow diagram showing other processing operations that may be performed according to one or more example embodiments.

FIG. 6 is a flow diagram showing processing operations that may be performed in accordance with another example embodiment, using the FIG. 2 scenario for illustration. It will be appreciated that variations are possible, for example to add, remove and/or replace certain operations. The operations may be performed in hardware, software or a combination thereof. The processing operations may be performed, for example, by the management system 108.

A first operation 602 may comprise identifying a plurality of target nodes.

A second operation 604 may comprise determining a value of Δd for each target node.

A third operation 606 may comprise determining an aggregated/average value of Δd for the plurality of target nodes.

The choice of which target nodes 110 to use may be based on distance from the first and second base stations 102, 104. For example, the N closest target nodes 110 to the first and second base stations 102, 104 may be selected for use in the operations described herein.

In some embodiments, whether one or multiple target nodes are used, the management system 108 may perform the operations 400 described with reference to FIG. 4, or those described with reference to FIG. 5 or 6, over a plurality of time periods for a plurality of different positions of the one or more target nodes. The benefit is that the average across multiple Δd values should converge to the true time drift between the first and second base station transmissions, and hence the average value may be used as a reference for correcting time drift. This is compared with the RSTD which is likely to be constant for different positions of the one or more target nodes 110.

Figure 7:
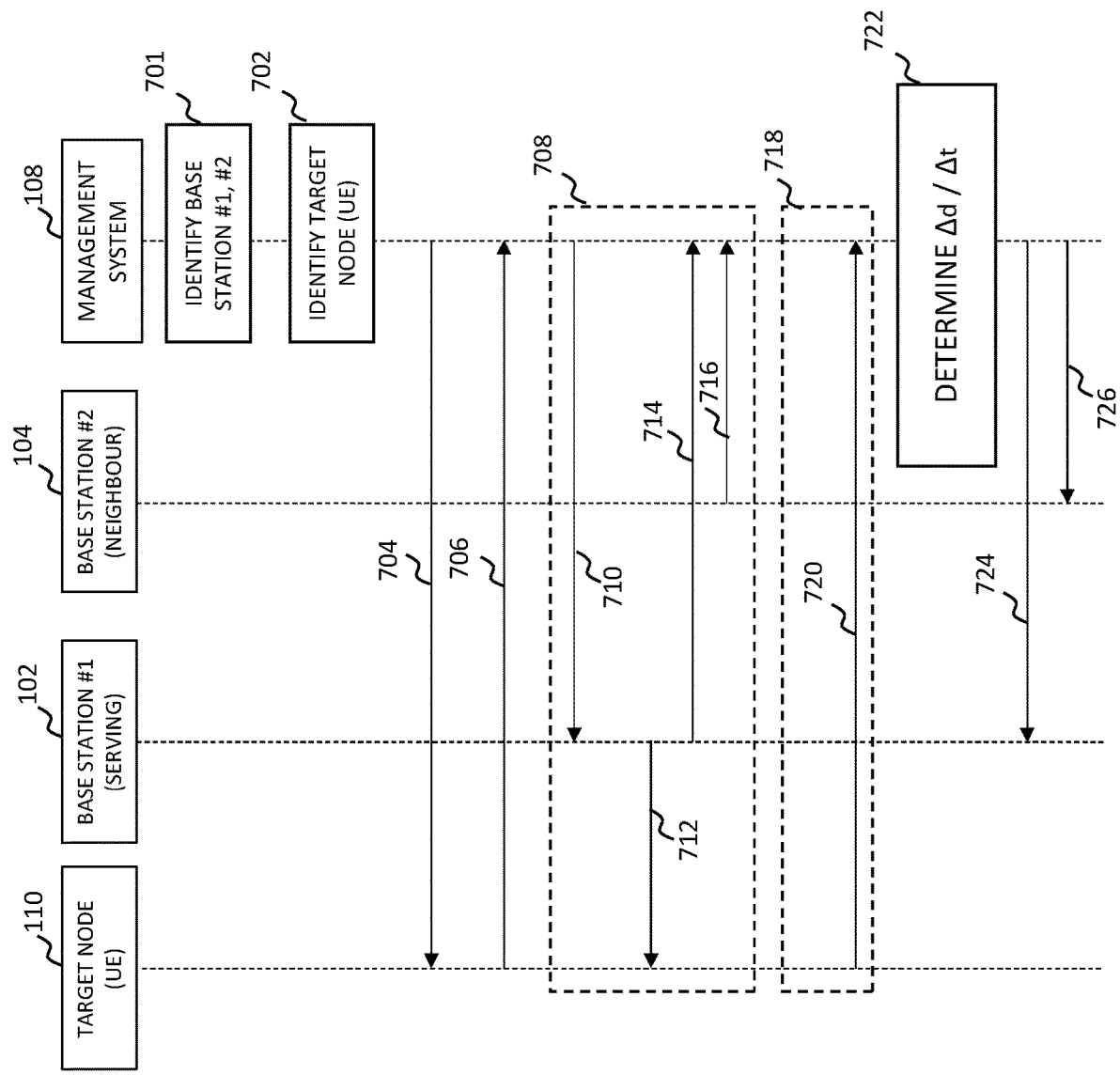
FIG. 7 is a signal flow diagram indicating an order of signals according to one or more example embodiments.

FIG. 7 is a signal flow diagram indicative of executions and signals between the various elements of FIG. 1. It is assumed in this example that the first base station 102 is the serving base station.

An operation 701 may comprise identifying the first and second base stations 102, 104. This may be performed at the management system 108 in response to identifying a potential synchronization error situation, e.g. due to a decrease in positional accuracy.

An operation 702 may comprise identifying a target node 110, for example a UE, which may be that which is closest in distance to the identified first and second base stations 102, 104.

An operation 704 may comprise the management system 108 transmitting to the target node 110 location assistance data, e.g. according to the LTE Positioning Protocol.

An operation 706 may comprise the target node 110 transmitting a RSTD measurement for the first and second base stations to the management system 108.

Two sub-embodiments 708, 718 will now be described, either of which can be used.

In a first sub-embodiment 708, an operation 710 may comprise the management system 108 transmitting a reference signal request or recommendation to the first base station 102 (as serving base station) to configure it to receive a reference signal, e.g. an SRS signal. The first base station 102 may then, in an operation 712 send an SRS configuration signal to the target node 110 for sending an SRS signal to the first and second base stations 102, 104. In operations 714, 716, responsive to receiving respective SRS signals, the first and second base stations 102, 104 may report their respective AoA measurements to the management system 108.

In a second sub-embodiment, denoted by reference numeral 718, an operation 720 may comprise the management system 108 receiving from the target node 110 a beam and base station specific RSRP measurement for downlink angle-of-departure (AoD), that is AoD-related measurements.

Whichever of the sub-embodiments is used, an operation 722 may comprise determining a value of Δd/Δt for comparison with the reported RSTD measurement to calculate the required timing correction which may be transmitted to the first and second base stations 102, 104 in subsequent operations 724, 726.

Figure 8:
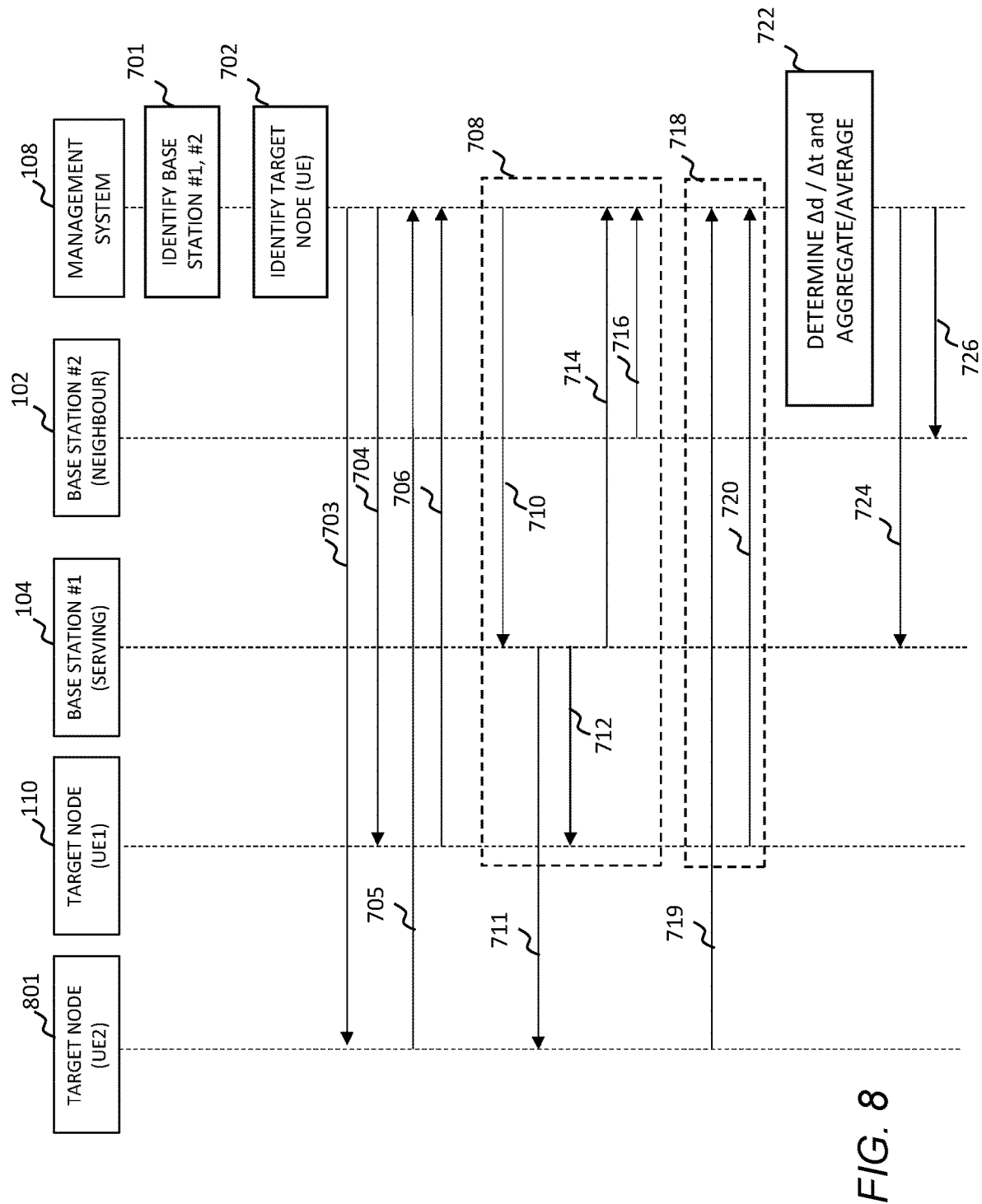
FIG. 8 is a signal flow diagram indicating an order of signals according to one or more other example embodiments.

FIG. 8 is a signal flow diagram, similar to that of FIG. 7, indicative of executions and signals between the various elements of FIG. 1 but adapted to involve also a second target node 801. It is assumed in this example that the first base station 102 is the serving base station.

An operation 701 may comprise identifying the first and second base stations 102, 104. This may be performed at the management system 108 in response to identifying a potential synchronization error situation, e.g. due to a decrease in positional accuracy.

An operation 702 may comprise identifying the first and second target nodes 110, 801, for example UEs, which may be those UEs which are closest in distance to the identified first and second base stations 102, 104. A line-of-sight (LOS) status may also be taken into account for identifying the first and second target nodes 110, 801.

An operation 703 may comprise the management system 108 transmitting to the second target node 801 location assistance data, e.g. according to the LTE Positioning Protocol (LPP).

An operation 704 may comprise the management system 108 transmitting to the first target node 110 location assistance data, e.g. according to the LPP. Operations 703 and 704 may be performed in parallel or in any order.

Operations 705, 706 may comprise the first and second target nodes 110, 801 transmitting respective RSTD measurements for the first and second base stations to the management system 108.

In the first sub-embodiment 708, an operation 710 may comprise the management system 108 transmitting a reference signal request or recommendation to the first base station 102 (as serving base station) to configure it to receive a reference signal, e.g. an SRS signal. The first base station 102 may then, in operations 711, 712, send an SRS configuration signal to the second and first target nodes 801, 110 for sending an SRS signal to the first and second base stations 102, 104. In operations 714, 716, responsive to receiving respective SRS signals, the first and second base stations 102, 104 may report their respective AoA measurements for the target nodes 801, 110 to the management system 108.

In the second sub-embodiment 718, operations 719, 720 may comprise the management system 108 receiving from the second and first target nodes 801, 110 respective beam and base station specific RSRP measurements for downlink angle-of-departure (AoD), that is AoD-related measurements.

Whichever sub-embodiment is used, an operation 722 may comprise determining a value of Δd for the first and second target nodes 801, 110 and averaging them, and possibly averaging them over multiple positions over time, to derive an aggregated or averaged value for comparison with the reported RSTD measurements to calculate the required timing correction, which may be an improved version of the current timing correction. The timing correction may be transmitted to the first and second base stations 102, 104 in subsequent operations 724, 726.

Technical advantages of the example embodiments include mitigating the effects of timing drift (unsynchronised clocks) between base stations using over-the-air signalling, as opposed to some conventional approaches which involve cabling between base stations to ensure synchronization. Cabled approaches are expensive and not always practical if the distances between base stations is large and/or the network is complex. In example embodiments, the position of the target node does not need to be known and the use of one or more target nodes is effective. The one or more target nodes may even be in motion when used, and this can improve accuracy. Unlike methods that use, for example GNSS reference signals for synchronization, example embodiments can be used indoors and are found to be more accurate. No additional signal types need to be used beyond those already provided by RAN standards.

Example Analysis

Figure 9:
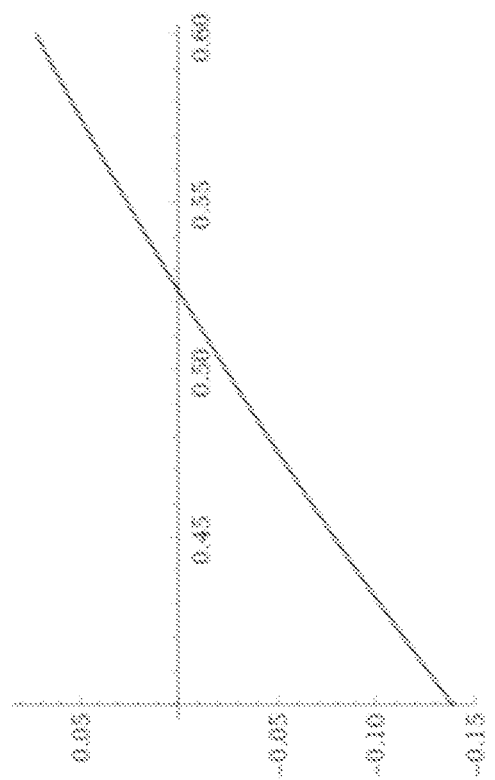
FIG. 9 is a graph indicating measurements useful for understanding one or more example embodiments.

Referring to FIG. 9, a plot is shown with respect to $\theta_1$ based on the factor:

$$\frac{\sin\theta_2 - \sin\theta_1}{\sin(\theta_1 + \theta_2)} \qquad (6)$$

over a range of angular error measurements for $\theta_1$.

For typical values of $\theta_2$ (e.g. 20°-160°) it can be observed that an error of 0.5° for $\theta_1$ yields an error r≈0.01 or 1%. This corresponds to the maximum error at r, i.e. the point was chosen as the maximum observed slope in FIG. 9. Hence, assuming an error only for $\theta_1$, it is observed from equation (4) that Δd=1% of the inter-site distance l. It is therefore observed that the accuracy of Δd is directly proportional to the inter-site distance l.

For some cases of interest, a short inter-site distance l may be assumed. An inter-site distance l=20 metres, for example, yields an accuracy of d±0.2 metres. If an error is assumed at both $\theta_1$ and $\theta_2$, the maximum deviation based on the factor (6) is found to double, i.e. so that r≈0.02, or 2%, or d±0.4 metres for l=20 metres. In the time domain, this corresponds to an accuracy of approximately 1.2 ns. For a larger inter-site distance of, e.g. l=100 metres, the above analysis where an error is assumed at both $\theta_1$ and $\theta_2$ is found to yield an accuracy of d±2 metres. In the time domain, this corresponds to an accuracy of approximately 6 ns. Thus, it may be concluded that time correction accuracy at the ns level is feasible using example embodiments described herein.

Hardware

Figure 10:
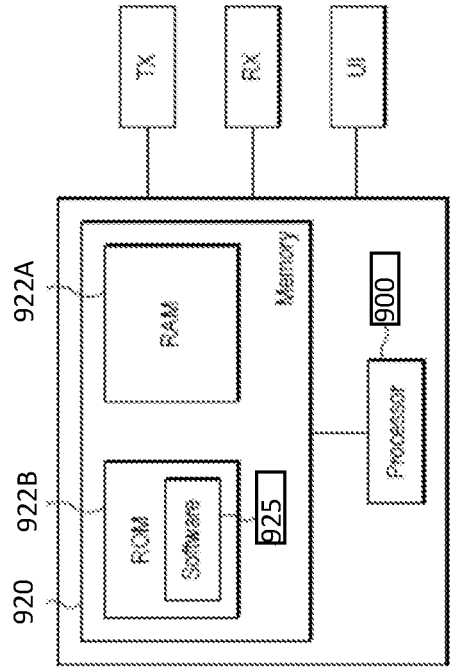
FIG. 10 is a schematic view of an apparatus configured to perform operations according to one or more example embodiments.

FIG. 10 shows an example apparatus that may provide the management system 108 or an equivalent system.

The apparatus comprises at least one processor 900 and at least one memory 920 directly or closely connected or coupled to the processor. The memory 920 may comprise at least one random access memory (RAM) 922A and at least one read-only memory (ROM) 922B.

Computer program code (software) 925 may be stored in the ROM 922B. The apparatus may be connected to a transmitter path and a receiver path in order to obtain respective signals comprising the aforementioned data. The apparatus may be connected with a user interface (UI) for instructing the apparatus and/or for outputting data. The at least one processor 900 with the at least one memory 920 and the computer program code may be arranged to cause the apparatus to at least perform methods described herein.

The processor 900 may be a microprocessor, plural microprocessors, a control, or plural microcontrollers.

The memory 920 may take any suitable form.

The transmitter path and receiver path may be established using a transceiver module which may be arranged suitable for any form of radio communications, for example cellular radio communications according to 2G, 3G, 4G, LTE, 5G or future-generation standards.

Figure 11:
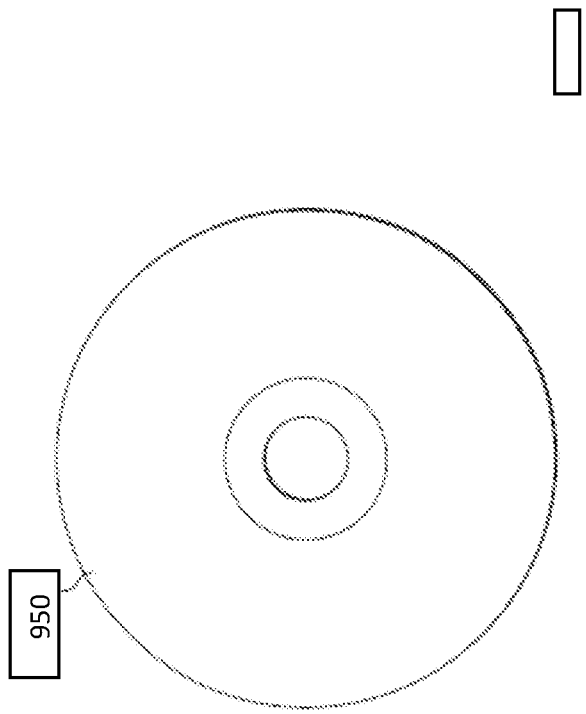
FIG. 11 is a non-transitory medium which may be used to store computer-readable code which, when executed by one or more processors of an apparatus, may perform operations according to one or more example embodiments.

FIG. 11 shows a non-transitory media 950 according to some embodiments. The non-transitory media 950 is a computer readable storage medium. It may be e.g. a CD, a DVD, a USB stick, a blue ray disk, etc. The non-transitory media 800 stores computer program code causing an apparatus to perform operations described above when executed by a processor such as processor 900 of FIG. 10.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. An apparatus comprising:
   at least one processor; and
   at least one memory including computer program code, the at least one memory and computer program code configured to, with the at least one processor, to cause the apparatus to:
   estimate a first angle (θ1) between a first path between a first base station and at least one target node and a second path between the first base station and a second base station, estimate a second angle (θ2) between a third path between the second base station and the at least one target node and the second path;
   determine a value (Δd) indicative of a difference between a first distance from the at least one target node to the first base station and a second distance from the at least one target node to the second base station, wherein to determine the value is based on the estimated first and second angles (θ1) (θ2) and a known distance (l) between the first and second base stations;
   receive from the at least one target node a reference signal time difference (RSTD) measurement between the first base station and the second base station;
   convert the determined value (Δd) into a time-domain value (Δt);
   determine a timing correction value based on a comparison of the time-domain value (Δt) and the received RSTD; and
   use the timing correction value so as to synchronize respective clocks of said first and second base stations.

2. The apparatus of claim 1, wherein the apparatus is caused to determine the value (Δd) using the geometric relationship:

$$d1 - d2 = l \frac{\sin\theta_2 - \sin\theta_1}{\sin(\theta_1 + \theta_2)}$$

where d1 is the first distance from the at least one target node to the first base station and d2 is the second distance from the at least one target node to the second base station.

3. The apparatus of claim 1 is further caused to estimate a position of the at least one target node using the received RSTD measurement, wherein the timing correction is used to modify the position estimate.

4. The apparatus of claim 1, is further caused to estimate the first angle (θ1), estimate the second angle (θ2) and determine the value (Δd) over a period of time for different positions of the at least one target node and determine an average or aggregated value therefrom for providing the timing correction.

5. The apparatus of claim 1, is further caused to estimate the first angle (θ1), estimate the second angle (θ2) and determine the value (Δd) for a plurality of target nodes and provide an average or aggregated value therefrom for providing a timing synchronization correction between the first and the second base stations.

6. The apparatus of claim 1, is further caused to select the first and second base stations based on receiving a determined or reported decrease in positioning accuracy for said first and second base stations.

7. The apparatus of claim 1, is further caused to select the at least one target node from a plurality of target nodes based on its or their distance to the first and second base stations.

8. The apparatus of claim 1, wherein the apparatus is caused to estimate the first and second angles (θ1) (θ2) based on a received measurement from each of the first and second base stations indicative of an angle-of-arrival of an uplink signal from the at least one target node to antennas of the respective first and second base stations.

9. The apparatus of claim 8, wherein the apparatus is caused to estimate the first and second angles (θ1) (θ2) based on the received measurement from each of the first and second base stations and an additional angle based on relative orientations of the antennas of the first and second base stations.

10. The apparatus of claim 1, wherein the apparatus is caused to estimate the first and second angles (θ1) (θ2) based on a received measurement from the at least one target node indicative of an angle-of-departure of a downlink signal to said target node from each of the respective first and second base stations.

11. A method, the method comprising:
    estimating a first angle (θ1) between a first path between a first base station and at least one target node and a second path between the first base station and a second base station;
    estimating a second angle (θ2) between a third path between a second base station and the at least one target node and the second path;
    determining a value (Δd) indicative of a difference between a first distance from the at least one target node to the first base station and a second distance from the at least one target node to the second base station, wherein determining the value is based on a geometric relationship using the estimated first and second angles (θ1) (θ2) and a known distance (l) between the first and second base stations;
    receiving from the at least one target node a reference signal time difference (RSTD) measurement between the first base station and the second base station;
    converting the determined value (Δd) into a time-domain value (Δt);
    determining a timing correction value based on a comparison of the time-domain value (Δt) and the received RSTD; and
    using the timing correction value so as to synchronize respective clocks of said first and second base stations.

12. A non-transitory computer readable medium comprising program instructions stored thereon for performing a method, comprising:
    estimating a first angle (θ1) between a first path between a first base station and at least one target node and a second path between the first base station and a second base station;
    estimating a second angle (θ2) between a third path between a second base station and the at least one target node and the second path;
    determining a value (Δd) indicative of a difference between a first distance from the at least one target node to the first base station and a second distance from the at least one target node to the second base station, wherein determining the value is based on a geometric relationship using the estimated first and second angles (θ1) (θ2) and a known distance (l) between the first and second base stations;

receiving from the at least one target node a reference signal time difference (RSTD) measurement between the first base station and the second base station;

converting the determined value ($\Delta d$) into a time-domain value ($\Delta t$);

determining a timing correction value based on a comparison of the time-domain value ($\Delta t$) and the received RSTD; and using the timing correction value so as to synchronize respective clocks of said first and second base stations.

* * * * *